Feb. 27, 1962     O. SCHUELLER     3,022,643
AIR CONDITIONING SYSTEM FOR SPACE VEHICLES
Filed April 8, 1960     3 Sheets-Sheet 1

INVENTOR.
OTTO SCHUELLER
BY
ATTORNEYS

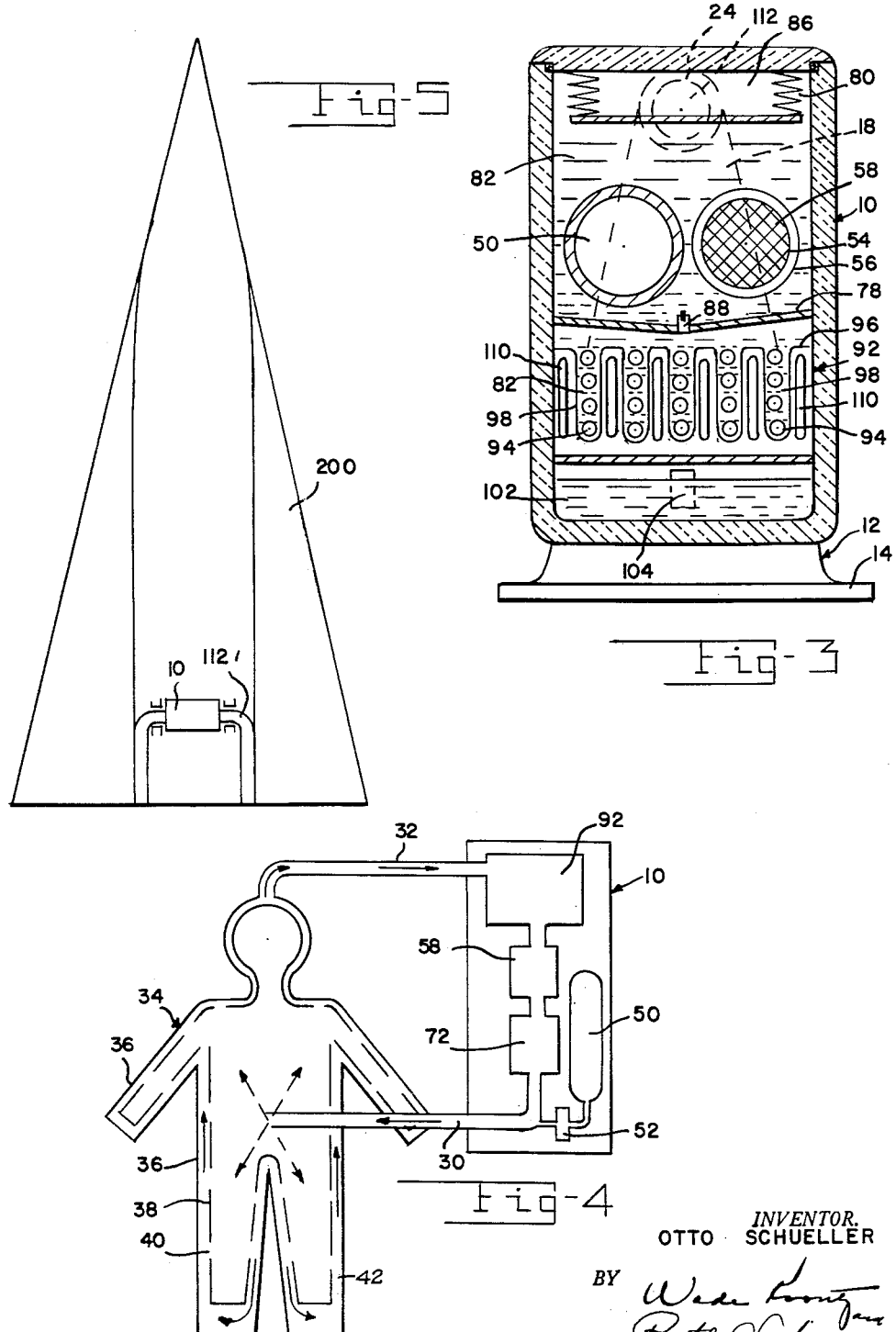

Feb. 27, 1962  O. SCHUELLER  3,022,643
AIR CONDITIONING SYSTEM FOR SPACE VEHICLES
Filed April 8, 1960  3 Sheets-Sheet 3
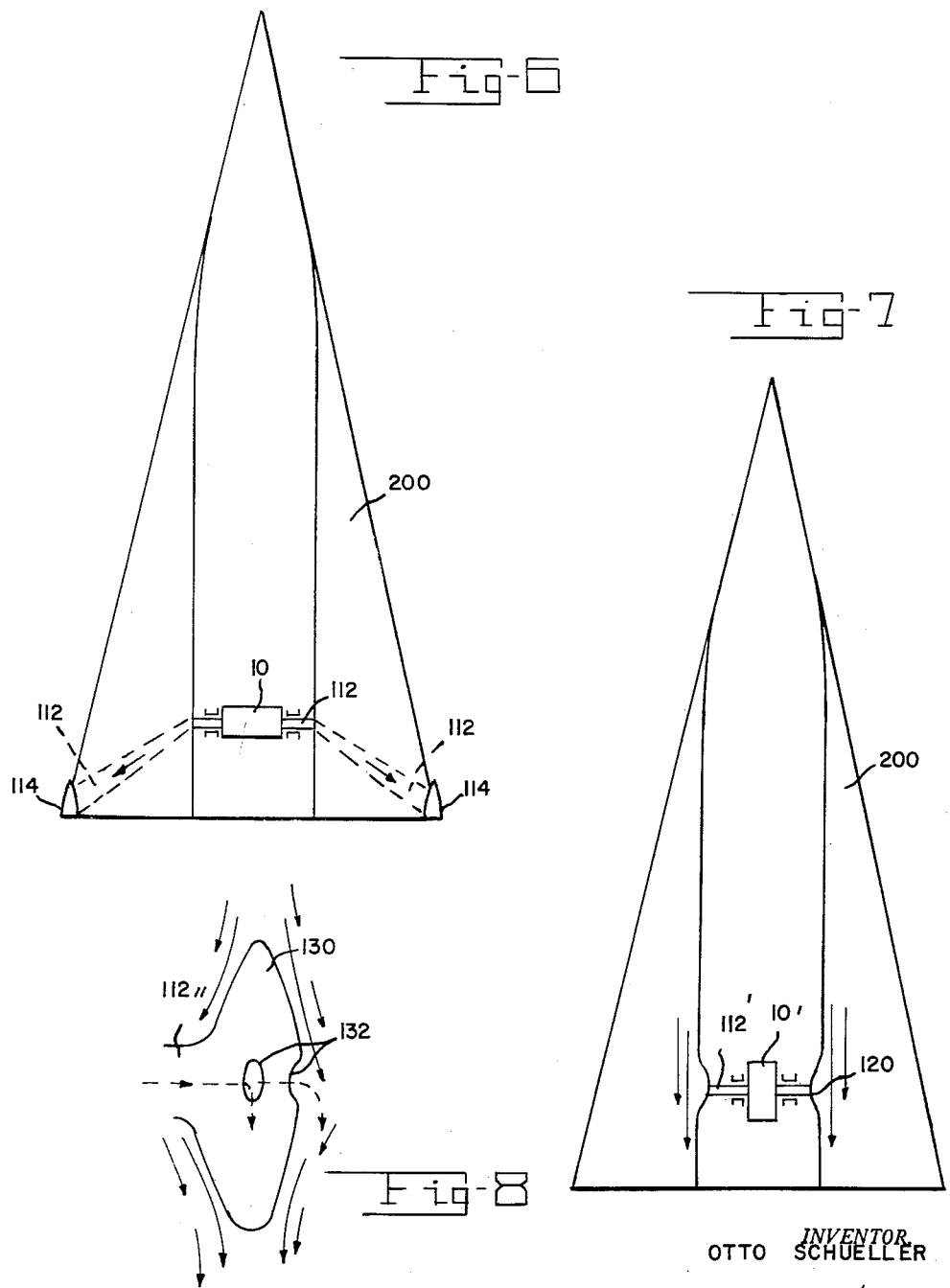
INVENTOR
OTTO SCHUELLER
BY
ATTORNEYS United States Patent Office 3,022,643
Patented Feb. 27, 1962

3,022,643
AIR CONDITIONING SYSTEM FOR
SPACE VEHICLES
Otto Schueller, 1953 E. Bataan Drive, Dayton 29, Ohio
Filed Apr. 8, 1960, Ser. No. 21,061
14 Claims. (Cl. 62—216)
(Granted under Title 35, U.S. Code (1952), sec. 266)

The invention described herein may be manufactured and used by or for the United States Government for governmental purposes without payment to me of any royalty thereon.

The present invention relates to oxygen conditioning systems for space vehicles and, more particularly, to a ram air evaporative cooling and conditioning system designed for minimizing the effects of periods of weightlessness, and for utilizing the vacuum in space for cooling.

Recirculatory respiratory-ventilation systems are well-known and have found practical application for instance in submarines. Smaller closed breathing systems have been used in diving suits and in devices employed in mine rescue work. These systems utilize chemical means for absorption of carbon dioxide, or utilize liquefaction of carbon dioxide by compression and cooling. Circulation is accomplished simply by breathing or in some cases, by mechanical means. Oxygen is added as required from stored gas or chemical reaction and some method of temperature control is employed which depends upon the environment.

In their present form, these conventional systems are not suitable for use in future aircraft, manned satellites, or spaced vehicles for the following reasons:

(1) In space, an abundant natural supply of water or air is not available for removal of heat by conduction and effective radiation of heat requires too high a temperature to be practical.

(2) The structure and heat dissipating equipment of the vehicle can be exposed to much higher temperatures than flight personnel can tolerate, therefore, providing cooling systems capable of maintaining the cabin and equipment at a temperature also tolerable to unprotected flight personnel, if this were possible, would impose intolerable penalties on vehicle performance.

(3) Fluctuating positive and negative accelerations over values several times the force of gravity will require special consideration in the basic design.

The present invention is the result of adapting the usual concept of recirculating closed respiratory-ventilation systems in such a manner as to provide practical and usable equipment for space vehicles.

The principles involved in the new and unique system of the invention may be stated briefly, as follows:

(1) The concept of an expendable coolant is adapted in such a manner as to render the system partially independent of atmospheric pressure by the manner of application of the evaporative cooling technique; this is done by obtaining rapid evaporation at temperatures lower than the boiling point by rapid movement of air, and also obtaining pressure reduction in the evaporator by the use of vehicle motion through the atmosphere to produce a vacuum, or conditions approximating a vacuum. Cooling is thus available during an entire space flight because of the low pressure conditions occurring naturally at extreme altitudes.

(2) The components of the system, such as carbon dioxide and odor absorbers, dust filter, circulating pump, oxygen container, pressure regulator and so on, are located in a common insulated container, with their external surfaces exposed to the coolant so that they function as precoolers in the system and are isolated from external high temperature.

(3) The entire package is swivel-mounted in the vehicle so that it turns automatically in the direction of mass forces (acceleration). Swiveling or rotating the package also serves to produce a gravity force for the liquids during the state of weightlessness. A bellows is provided over the coolant to provide a predetermined constant pressure and minimize the effect of weightless periods.

This arrangement of all of the components of the system in a common insulated container, utilizes each component to the fullest extent, provides the greatest possible reduction in size and weight, and facilitates service and handling.

In the drawing:

FIG. 3 is a vertical cross section taken substantially on the line 3—3 of FIG. 1.

FIG. 4 is a schematic diagram of the system, showing its connection with a space suit.

FIGS. 5, 6 and 7 are schematic plan views of an aircraft, showing three methods of making a contact with surrounding atmosphere, utilizing both vehicle motion and reduced atmosphere pressures for providing rapid evaporation of a coolant.

FIG. 8 shows a plan view of a modified form of vacuum ejector.

Figure 1:
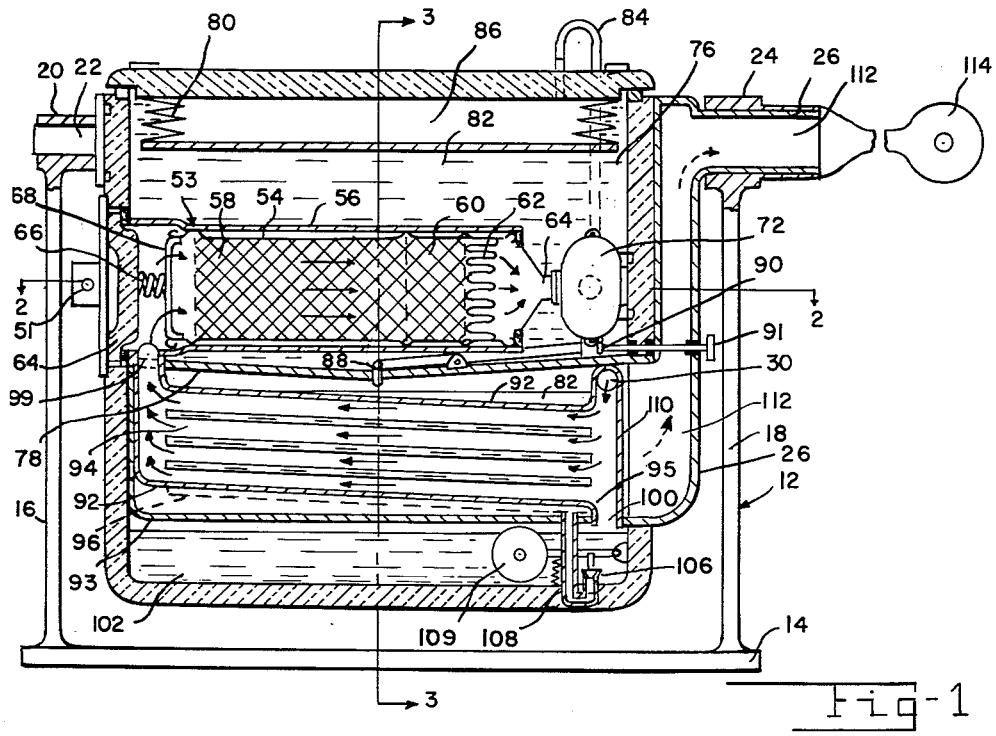
FIG. 1 is a schematic vertical longitudinal cross section of the package and its mounting, taken on the line 1—1 of FIG. 2.

Referring more in detail to the drawing:

The package, or insulated container, 10 is swivel mounted at points adjacent its upper portion. A supporting frame 12 is provided with a base 14 and a pair of supporting arms 16 and 18. A journaled bearing 20 on the arm 16 receives a boss 22 rigidly attached to the container 10. A journal bearing 24 located in the upper section of the arm 18 receives a flue outlet 26 later described. In operation, the frame 12 is rigidly mounted in an aircraft, with the supporting base 14 positioned at the lowest point of the device. The container 10 is thus swivelly mounted in the region of its upper portion about the pivots 22 and 26 so that when G-loads are applied, the container will swing on the swivel mount and align itself with the direction of the mass forces of acceleration.

The ducts 30 and 32 are led from the container or reconditioning package 10 and provide the inlet and outlet ducts or passages connecting the elements of the air conditioning unit with the space to be ventilated. The system is adaptable to reconditioning air for cabins of aircraft and like uses. The present showing is an adaptation to a closed circuit breathing and ventilating system including a space suit shown schematically at 34 in FIG. 4. The garment comprises an outer pressure shell 36, an inner loose body garment 38 provided with ventilating openings 40. The space 42 between the walls 36 and 38 may contain wool or other insulating material through which oxygen can freely circulate. The space immediately surrounding the flier's body communicates with and is part of the circulating and ventilating system in which the flier can comfortably inhale and exhale.

An oxygen supply bottle 50, containing oxygen under high pressure, supplies oxygen and a source of pressure to the system. The oxygen bottle is refilled through a filler valve represented schematically at 51. A pressure regulator 52 introduced between the oxygen supply and its connection with the main circulating system, regulates the pressure in the system. A sealed-in purifying component 53 forms part of the oxygen flow line. It comprises a removable cartridge 54, adapted to slide into a canister or other suitable element 56. The removable cartridge 54 contains at least three oxygen purifying elements: a carbon dioxide absorbing element 58 composed of lithium hydroxide and soda lime or other suitable $CO_2$ absorbing means; an activated carbon element 60 for the absorption of odors, and a dust filter 62. The cartridge 54 is installed into and removed from the canister 56 through a sealed door 64. A spring 66 and a spider 68 hold the cartridge resiliently in place. A sealed connection 70 seals the purifying component to an oxygen compressor or pump 72 for which an electrical source is supplied through the plug 74.

Figure 2:
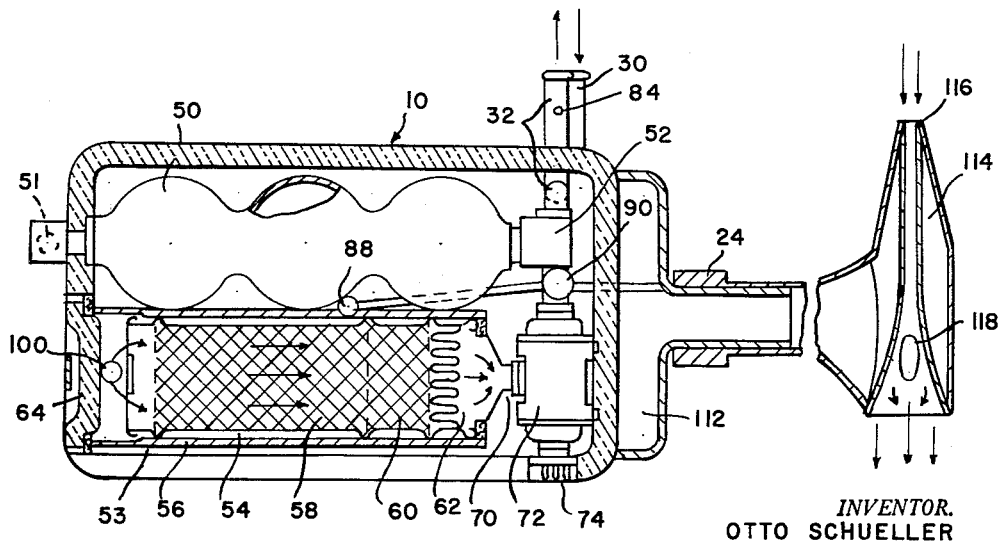
FIG. 2 is a horizontal and schematic cross section of the device, taken substantially on the line 2—2 of FIG. 1.

FIGS. 1 and 2 show the oxygen bottle and the purifying component placed side by side. This arrangement is optional. A thinner package can be obtained by placing these components one above the other. Such a package is indicated schematically in FIG. 7.

The elements above noted, namely the oxygen supply bottle 50, the pressure regulator 52, the canister 56 containing the oxygen purifying elements, and the pump or oxygen compressor 66 are all installed as compactly as possible in a coolant containing compartment 76. A slightly concaved floor 78 or partition element defines the lower portion of the compartment 76. Its ceiling is defined by a plate 81, maintained in a position of continuous contact with the liquid in the compartment by a bellows 80. The coolant may be any fluid found suitable. The properties of water or ice of availability, toxicity, safety and high yield of performance per pound make its use for the present system highly desirable. The external surfaces of the above noted elements are exposed to the coolant so that they also function as precoolers in the system and are isolated from external high temperature. The pressure inside the coolant chamber is maintained at a constant, for example 5 p.s.i., regardless of lowered gravity force or the complete absence of it. This constant pressure is maintained by means of the connecting duct 84, which provides communication from the oxygen supply 50, through the pressure regulator 52, to the chamber 86.

The floor 78 of the coolant containing chamber 76 is very slightly concaved toward its center. A valve 88, located in the floor 78, is governed by a thermostat 90, set to maintain a predetermined temperature in the system by an adjusting means 91.

The oxygen flow circulates through a closed system. It enters the package from the suit or cabin or other space being ventilated, through an inlet 30 and passes directly into the cooling or heat exchanger element 92, where the flow is cooled, and the moisture contained in it is condensed and drained off. A series of open ended ducts 94, each forming a divided part of the oxygen flow line, are inclined slightly from the horizontal to provide drainage for moisture condensed therein, and to provide maximum surface exposure to the coolant. The cooling element 92 is, itself, placed within an evaporator unit defined by the walls 93 and the partition 78, and is open to the atmosphere as later described. A series of pockets or coolant containers 98, made of fabric or other porous material, are secured into a frame 96 at their upper open ends. The pockets 98 receive the coolant as it flows through the valve 88. Each pocket is positioned to enclose with coolant one vertical row of ducts. The cooled and dried oxygen then passes through the opening 99 into the purifying component 53, through the pump or compressor 66 and back into the suit, or other space enclosure, through the outlet 30.

Moisture condensed in the ducts 94 (see 95, FIG. 1), drain through an opening 100 into a chamber 102 located in the lowermost portion of the package 10. The level of the condensed liquid in the condensation chamber is controlled by a swimmer or float 104 operating to open and close a valve 106. The valve 106 opens and closes a duct 108 which is connected into the lower portion of one of the fabric pockets 96. A plurality of such connections may be provided if desired. During periods of extreme heat as during the re-entry period, when heat conditions are extreme, a reserve water supply is provided by the water collected and stored in the chamber 102. It is directed through the duct 108 for evaporation in the pockets of the evaporator.

Evaporation is achieved by rapid movement of air around the evaporation elements. Since evaporation will occur rapidly at the boiling point of the coolant, and the boiling point is a function of pressure, low temperatures are achieved by providing communication between the evaporator and an atmosphere of lowered density. At high altitudes, lowered density and conditions approaching vacuum prevail outside the aircraft. Still more lowering of the density is achieved by fusilage designs which take advantage of lowered density areas caused by increased distance of travel of the slip stream. Base drag is also utilized.

In FIGS. 1, 2 and 6, a series of openings 110 in the evaporation chamber wall open to a flue duct 112, and to a vacuum ejector 114. The ejector 114 admits air at its lead end 116 and also through an opening 118. A vacuum is created which produces suction in the evaporation compartment. The conical expansion of the walls of the ejector toward the rear creates suction within the evaporation chamber, exposing the exterior of the porous pockets to low pressure or vacuum, thus causing rapid evaporation, lowered temperature and increased heat removal. It will be seen that the vacuum ejector provides a means for accommodating the performance of the system to conditions of both high altitude and low altitude.

FIG. 5 shows a method of utilizing base drag. Flue ducts 112' are directed rearwardly, communicating with the vacuum which is present in the area immediately to the rear of the aircraft. Above Mach 12, the pressure in this area is practically zero.

In FIG. 7, the aircraft fusilage is shown contracted. The flue ducts 112' open to the atmosphere at the point of greatest contraction, utilizing the vacuum produced in the slip stream in these areas.

The modified form of vacuum ejector shown in FIG. 8 utilizes lowered density areas produced by increased travel distance of the slip stream over convexed areas. A hollow body 130 of substantially ellipsoidal shape with narrowed ends and widened midsection provides such convexed surfaces. The ejector 130 is a closed body except for its open attachment to the evaporator flue 112" and the openings 132 which are located only at the widest diameter midsection of the ejector. Conditions approaching vacuum prevail in this area, and suction is produced in the evaporator. The direction of air flow is indicated by the arrows.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. A recirculating oxygen conditioning system for space vehicles comprising, a package swivel mounted for orientation with respect to G-load changes, a closed oxygen flow system located in said package and communicating by means of outlet and inlet with a space to be ventilated, a coolant storing compartment, a coolant supply in said compartment, an oxygen supply component, an oxygen purifying component, an oxygen compressor and a pressure regulator, each comprising an element in said closed oxygen flow system, and each located in said coolant compartment and surrounded by said coolant to provide precooling, a bellows regulated by said pressure regulator for exerting a predetermined constant pressure on said coolant in said coolant storing compartment, a cooling component located below said coolant storing compartment, a valve in the floor of said storing compartment for regulated flow of coolant from said coolant storing compartment to said cooling compartment, porous coolant containing means in said cooling compartment for receiving said coolant, oxygen flow ducts incorporated into said oxygen flow system, and located to be surrounded by coolant contained in said porous containing means, and means for exposing the exterior surface of said porous means to outside atmosphere for reducing pressure and producing evaporation and the resulting cooling of the oxygen in said oxygen flow ducts.

2. A recirculating oxygen conditioning system for space vehicles comprising, a package, swivel mounted for orientation with respect to G-load changes, a closed oxygen flow system located in said package and communicating by means of outlet and inlet with a space to be ventilated, a coolant storing compartment, a coolant supply in said compartment, an oxygen supply component, an oxygen purifying component, an oxygen compressor and a pressure regulator, each comprising an element in said closed oxygen flow system, and each located in said coolant compartment and surrounded by said coolant to provide precooling, a bellows regulated by said pressure regulator for exerting a predetermined constant pressure on said coolant in said coolant storing compartment, a cooling component located below said coolant storing compartment, a valve in the floor of said storing compartment for regulated flow of coolant from said coolant storing compartment to said cooling compartment, porous coolant containing means in said cooling compartment for receiving said coolant, oxygen flow ducts incorporated into said oxygen flow system, and located to be surrounded by coolant contained in said porous containing means, means for exposing the exterior surface of said porous means to outside atmosphere for reducing pressure and producing evaporation and the resulting cooling of the oxygen in said oxygen flow ducts and condensation of moisture therein, a water reserve compartment located below said cooling compartment and communicating with said oxygen flow ducts for receiving moisture condensed therein, and means for providing controlled communication between said water reserve compartment and said porous means for delivering said condensed moisture to said porous coolant container for evaporation therein.

3. A recirculating oxygen conditioning system for space vehicles comprising an insulated package, a swivel mount for said package located adjacent its upper area for allowing said package to align with the direction of G-load, a closed oxygen flow system located in said package and communicating by means of inlet and outlet with a space to be ventilated, a coolant storing compartment, a coolant supply in said compartment, means for exerting a predetermined constant pressure on said coolant, said means comprising a bellows located in said coolant storing compartment and communicating through a pressure regulator with an oxygen supply for negating effects on said coolant of periods of weightlessness.

4. A recirculating oxygen conditioning system for space vehicles comprising an insulated package, a swivel mount for said package located adjacent its upper area for allowing said package to align with the direction of G-load, a closed oxygen flow system located in said package and communicating by means of inlet and outlet with a space to be ventilated, a coolant storing compartment, a coolant supply in said compartment, means for exerting a predetermined constant pressure on said coolant, said means comprising a bellows located in said coolant storing compartment and communicating through a pressure regulator with an oxygen supply for negating effects on said coolant of periods of weightlessness, means for cooling the oxygen flowing through said closed flow system, said cooling means comprising a porous member located adjacent and outside of said coolant storing compartment and receiving coolant therefrom, said porous member surrounding a portion of said closed oxygen flow system for cooling oxygen contained therein, a vacuum ejector communicating with the atmosphere outside the space vehicle, means for providing communication between said cooling compartment and said vacuum ejector to expose said porous member to lowered pressure.

5. A recirculating oxygen conditioning system for space vehicles comprising an insulated package, a swivel mount for said package located adjacent its upper area for allowing said package to align with the direction of G-load, a closed oxygen flow system located in said package and communicating by means of inlet and outlet with a space to be ventilated, a coolant storing compartment, a coolant supply in said compartment, means for exerting a predetermined constant pressure on said coolant, said means comprising a bellows located in said coolant storing compartment and communicating through a pressure regulator with an oxygen supply for negating effects on said coolant of periods of weightlessness, means for cooling the oxygen flowing through said closed flow system, said cooling means comprising a porous member located adjacent and outside of said coolant storing compartment and receiving coolant therefrom, said porous member surrounding a portion of said closed oxygen flow system for cooling oxygen contained therein and condensing moisture therefrom, means for collecting and storing the condensed moisture for a reserve water supply and means for admitting said water to said porous member for evaporation therefrom.

6. A device for negating periods of weightlessness and overcoming effects of G-load changes in space vehicle oxygen reconditioning packages comprising a coolant storing compartment, a cooling compartment, a closed oxygen flow system connected by means of inlet and outlet to a space to be ventilated, means for maintaining constant pressure on said coolant in said coolant storing compartment, said means comprising a bellows exerting pressure thereon, the pressure in said bellows being maintained at a constant by communication through a regulator with said oxygen supply, a swivel mount for said package, located in the upper area thereof for maintaining the mass of said package in alignment with the direction of acceleration.

7. A device for cooling and reconditioning oxygen for space vehicles comprising an insulated package, a closed oxygen circulating flow system in said package, an oxygen cooling system in said package for cooling the oxygen in said closed system and removing moisture therefrom, said oxygen flow system having inlet and outlet communication with a closed space to be ventilated, a coolant, said closed oxygen circulating flow system being provided with oxygen supply, oxygen purifying and pressure regulating components, said components being located to be surrounded by coolant and function as precoolers, a cooling component, means for conducting said coolant in regulated flow to said cooling component, said cooling component comprising ducts arranged in parallel in said oxygen flow system, for dividing said oxygen flow, a plurality of pockets of porous material in said cooling components, said pockets having open upper ends for receiving coolant, each pocket being arranged to enclose and surround with coolant one vertical row of oxygen ducts, means for exposing the outside surfaces of said pockets to reduced pressure for increasing the rate of evaporation of said coolant for cooling said oxygen and condensation of moisture contained therein.

8. A device for cooling and reconditioning oxygen for space vehicles comprising an insulated package, a closed oxygen circulating flow system in said package, an oxygen cooling system in said package for cooling the oxygen in said closed system and removing moisture therefrom, said oxygen flow system having inlet and outlet communication with a closed space to be ventilated, a coolant, an oxygen supply component, an oxygen purifying component and a pressure regulator component, each of said components comprising an in-series part of said closed oxygen circulating flow system, said components being located to be surrounded by coolant and function as precoolers, a cooling component, means for conducting said coolant in regulated flow to said cooling component, said cooling component comprising ducts arranged in parallel in said oxygen flow system, for dividing said oxygen flow, a plurality of pockets of porous material in said cooling components, said pockets having open upper ends for receiving coolant, each pocket being arranged to enclose and surround with coolant one vertical row of oxygen ducts, means for exposing the outside surfaces of said pockets to reduced pressure for increasing the rate of evaporation of said coolant for cooling said oxygen and condensation of moisture contained therein, a swivel mount for said package for aligning the mass of said package with the direction of acceleration or G-load, and means for maintaining pressure constant on said coolant, for overcoming the effects of weightlessness.

9. A recirculating oxygen conditioning system for space craft comprising an insulated container, a coolant storing compartment in said container, a coolant liquid, an oxygen supply bottle, an oxygen purifying unit, an oxygen compressor and a pressure regulator compacted in said coolant storing compartment, each comprising an in-series element of said recirculating oxygen conditioning system and each presenting a surface to said coolant to function as precoolers, a concaved floor in said coolant storing compartment, a thermostat controlled valve in the center of said concave floor, means for maintaining a predetermined constant pressure on said coolant for overcoming decreased gravity and gravity free conditions, said means comprising a bellows at the upper portion of said container positioned to exert pressure on said coolant and enclosing a space, said space having communication with said oxygen supply through said pressure regulator, a cooling component located in a compartment below said floor comprising a plurality of ducts dividing said oxygen flow line, said ducts being arranged in vertical rows, means for surrounding said ducts with coolant fluid, said means comprising a series of porous pockets for receiving coolant delivered through said valve and a flue for providing communication of said evaporating frame with the atmosphere exterior of said aircraft around said pockets for increasing rate of evaporation of said coolant fluid.

10. A closed system for cooling and reconditioning oxygen for space vehicles and space suits comprising an insulated package, a cooling fluid contained in said package, in-series oxygen reconditioning elements contained in said cooling fluid, all surface areas of all of said elements being completely surrounded by cooling fluid, said elements comprising: an oxygen storage container, a carbon dioxide absorbing element, a purifying filter element, an evaporater system, a closed oxygen circulation system, a regulator for regulating intake of oxygen from said oxygen storage container, and a motor and pump for effecting circulation of oxygen through said system, an evaporating chamber and means for admitting said coolant into said chamber.

11. In a package as defined in claim 10, means for confining the liquid contained in said package and preventing its disbursement during periods of zero gravity and G-load changes, said means comprising a plate, a bellows control for holding said plate constantly in contact with said liquid, said bellows being provided with a regulated and predetermined pressure.

12. In a recirculating oxygen conditioning system for space vehicles comprising an insulated package, a liquid coolant contained in said package, oxygen conditioning elements contained in said liquid for oxygen purification, for oxygen replenishment, for oxygen cooling, for oxygen circulation, all of said elements being immersed in said cooling liquid and presenting all surface areas thereof to said liquid for heat exchange, means for preventing disbursement of said liquid and maintaining said liquid in an intact liquid body under conditions of zero gravity and conditions of G-load change.

13. In an oxygen conditioning system as set forth in claim 12, means for accommodating said package to conditions of high altitude and low altitude, said means comprising a vacuum ejector element in communicating attachment with said evaporating system and with the outside atmosphere.

14. An insulated package as set forth in claim 12, pivotally mounted in a position adjacent one end thereof whereby directional accommodation is effected to G-load changes.

References Cited in the file of this patent

UNITED STATES PATENTS

| | | |
|---|---|---|
| 2,643,282 | Greene | June 23, 1953 |
| 2,717,319 | Bundy | Sept. 6, 1955 |
| 2,819,590 | Green | Jan. 14, 1958 |
| 2,877,966 | Summers | Mar. 17, 1959 |
| 2,922,291 | Fox et al. | Jan. 26, 1960 |
| 2,941,372 | Taylor | June 21, 1960 |
| 2,947,154 | Chausson | Aug. 2, 1960 |